(12) United States Patent
Blackburn (10) Patent No.: US 7,533,859 B2
(45) Date of Patent: May 19, 2009

(54) ARTICULATING SUPPORT ARM WITH INTEGRAL ANGLED ABUTMENT

(75) Inventor: Nicholas L. Blackburn, Wellesley (CA)

(73) Assignee: CompX International Inc., Kitchener, Ontario (CA)

( * ) Notice: Subject to any disclaimer, the term of this patent is extended or adjusted under 35 U.S.C. 154(b) by 0 days.

(21) Appl. No.: 11/935,059

(22) Filed: Nov. 5, 2007

(65) Prior Publication Data

US 2008/0142661 A1    Jun. 19, 2008

Related U.S. Application Data

(60) Provisional application No. 60/864,314, filed on Nov. 3, 2006.

(51) Int. Cl.
*E04G 3/00* (2006.01)
(52) U.S. Cl. .................... 248/286.1; 248/918
(58) Field of Classification Search .......... 248/286.1, 248/281.11, 371, 918, 923, 229.1; 108/7
See application file for complete search history.

(56) References Cited

U.S. PATENT DOCUMENTS

| | | | | |
|---|---|---|---|---|
| 5,037,054 A | * | 8/1991 | McConnell | 248/284.1 |
| 5,145,136 A | * | 9/1992 | McConnell | 248/284.1 |
| 5,257,767 A | * | 11/1993 | McConnell | 248/284.1 |
| 5,881,984 A | * | 3/1999 | Lin | 248/284.1 |
| 5,915,657 A | * | 6/1999 | Ptak | 248/286.1 |
| 6,021,985 A | * | 2/2000 | Hahn | 248/286.1 |
| 6,027,090 A | * | 2/2000 | Liu | 248/281.11 |
| 6,135,404 A | * | 10/2000 | Wisniewski et al. | 248/281.11 |
| 6,270,047 B1 | * | 8/2001 | Hudson | 248/286.1 |
| 6,322,031 B1 | * | 11/2001 | LeClair et al. | 248/286.1 |
| 6,601,812 B2 | * | 8/2003 | LeClair et al. | 248/286.1 |
| 7,004,438 B2 | * | 2/2006 | Lin | 248/289.11 |
| 2004/0262477 A1 | * | 12/2004 | Whitaker et al. | 248/284.1 |
| 2007/0163135 A1 | * | 7/2007 | Barber | 33/503 |
| 2007/0170326 A1 | * | 7/2007 | Timm et al. | 248/281.11 |

* cited by examiner

Primary Examiner—Ramon O Ramirez
(74) Attorney, Agent, or Firm—Daryl W. Schnurr (57) ABSTRACT

An articulating support arm is used with a work station and has a central body with two ends. The inner end has a base pivotally connected thereto and the outer end has a platform pivotally connected thereto. The platform has an angled abutment that is integral with the platform and is located to be contacted by a slider that moves from side to side on a threaded shaft located on the central body. As the shaft is rotated, the slider slides along the abutment to vary the pitch of the platform relative to the body.

23 Claims, 12 Drawing Sheets

ARTICULATING SUPPORT ARM WITH INTEGRAL ANGLED ABUTMENT

Applicant claims the benefit of U.S. Provisional Application Ser. No. 60/864,314 filed on Nov. 3, 2006.

BACKGROUND OF THE INVENTION

1. Field of the Invention

This invention relates to an articulating support arm having a central body pivotally connected between a base and a platform in which the platform has an integral angled abutment therein.

2. Detailed Description of the Prior Art

A keyboard tilt mechanism is described in U.S. Pat. No. 6,270,047 issued on Aug. 7, 2001 and names Randy Hudson as inventor. The keyboard tilt mechanism has a slide link that is mounted on a shaft 28 as well as being mounted on a shaft 54 that is tilted or angled and extends from one end of the platform to the other. The shaft 54 is a separate component from the platform 18 and must be installed in the platform when the tilt mechanism is assembled. In addition, since the slide link 44 has a circular opening 52 therein through which the angled shaft 54 is inserted, the shaft 54 must be installed on the platform 18 after the slide link has been installed on the shaft 54. The shaft 54 is made from metal.

SUMMARY OF THE INVENTION

It is an object of the present invention to provide an articulating support arm where the platform of the arm is made from thermoplastic, and more particularly, fibre reinforced plastic with an abutment extending across said platform at an angle relative to the side edges. A slider moves across the platform in contact with angled abutment to vary the pitch of the platform.

An articulating support arm for use with a work station as a central body with two ends the two ends being an inner end and an outer end. The inner end has a base pivotally connected thereto and the outer end has a platform pivotally connected thereto. The base is directly or indirectly connected to the workstation. The platform has an angled abutment that is integral with the platform, the abutment being located to be contacted by a slider extending between the abutment and a threaded shaft rotatably mounted at or near the outer end. The shaft extends parallel to a pivot axis extending between the body and the platform. The slider is constructed to move along the shaft as the shaft rotates, the slider being sized and shaped to simultaneously slide along the abutment as the slider moves along the shaft to vary a pitch of the platform relative to the body.

An articulating support arm is used with a workstation, said support arm comprising a central body with two ends. The two ends are an inner end and an outer end, the inner end being pivotally connected to a base, the base being directly or indirectly connected to the workstation. The outer end is pivotally connected to a platform, the platform having an abutment that is integral therewith. A shaft is rotatably mounted at or near the outer end of the central body, the shaft having a first screw thread thereon. A slider is mounted on the shaft, the slider having a second screw thread corresponding to the first screw thread. The slider moves along the shaft as the shaft rotates. The abutment is oriented at an angle to the shaft and the slider is sized and shaped to contact and slide along the abutment as the shaft rotates, thereby varying a pitch of the platform relative to the body.

A method of constructing an articulating support arm for use with a workstation, the support arm having a central body with two ends. The two ends are an inner end and an outer end with a based being located at the inner end and a platform being located at the outer end. The method comprises pivotally connecting the central body to the base, forming the platform with an elongated angled abutment extending thereon, mounting a threaded slider on a threaded rotatable shaft in the central body at a rear of the outer end, sizing and shaping the slider to slide along the abutment as the shaft is rotated, thereby varying the pitch of the platform relative to the central body.

DETAILED DESCRIPTION OF A PREFERRED EMBODIMENT

Figure 1:
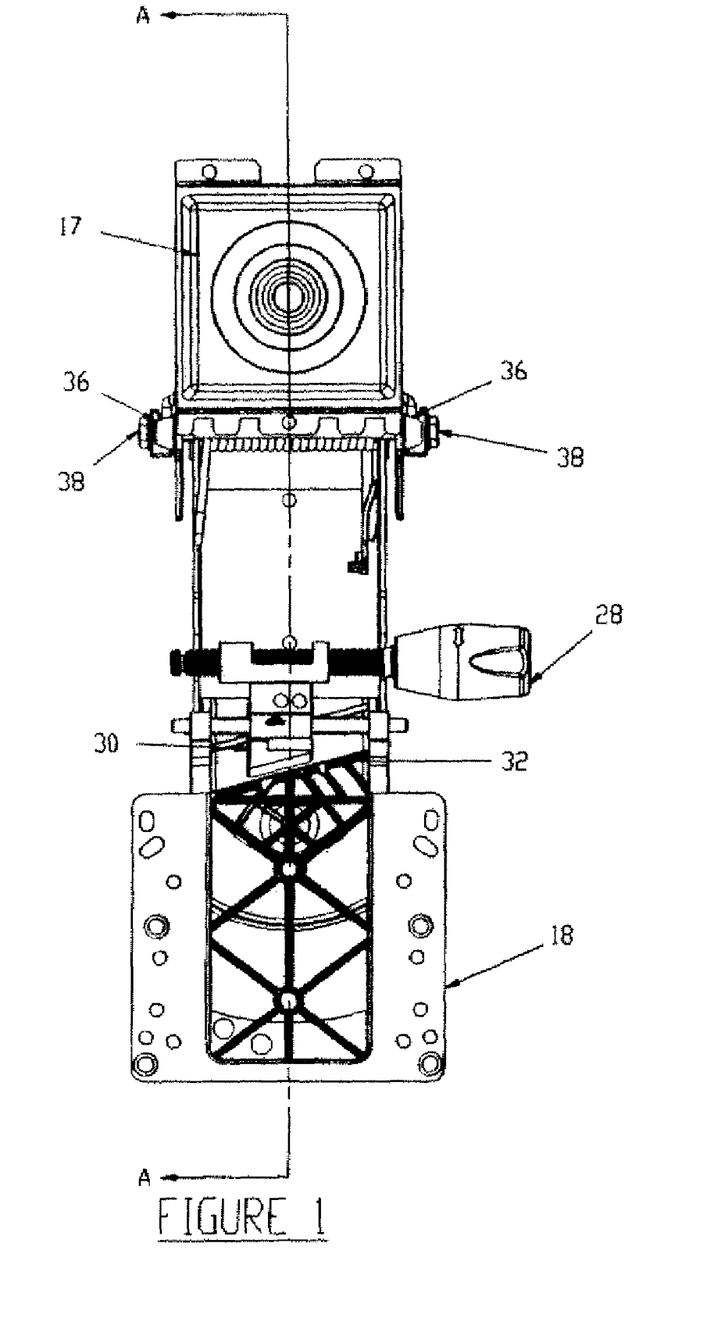
FIG. 1 is a top view of a support arm with a cover removed from a central body to expose a slider.
Figure 2:
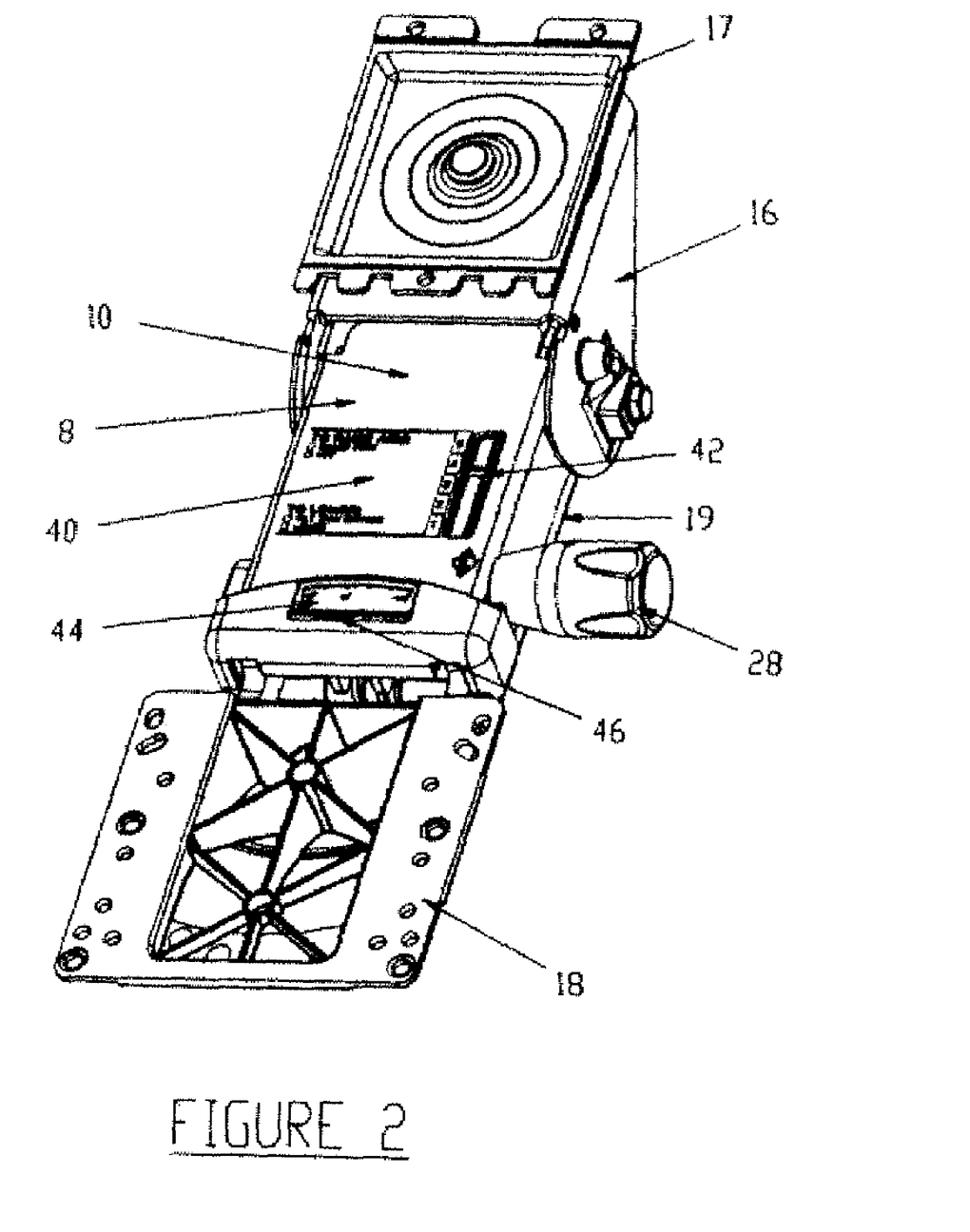
FIG. 2 is a prospective view of a support arm from a top with the cover in place.
Figure 3:
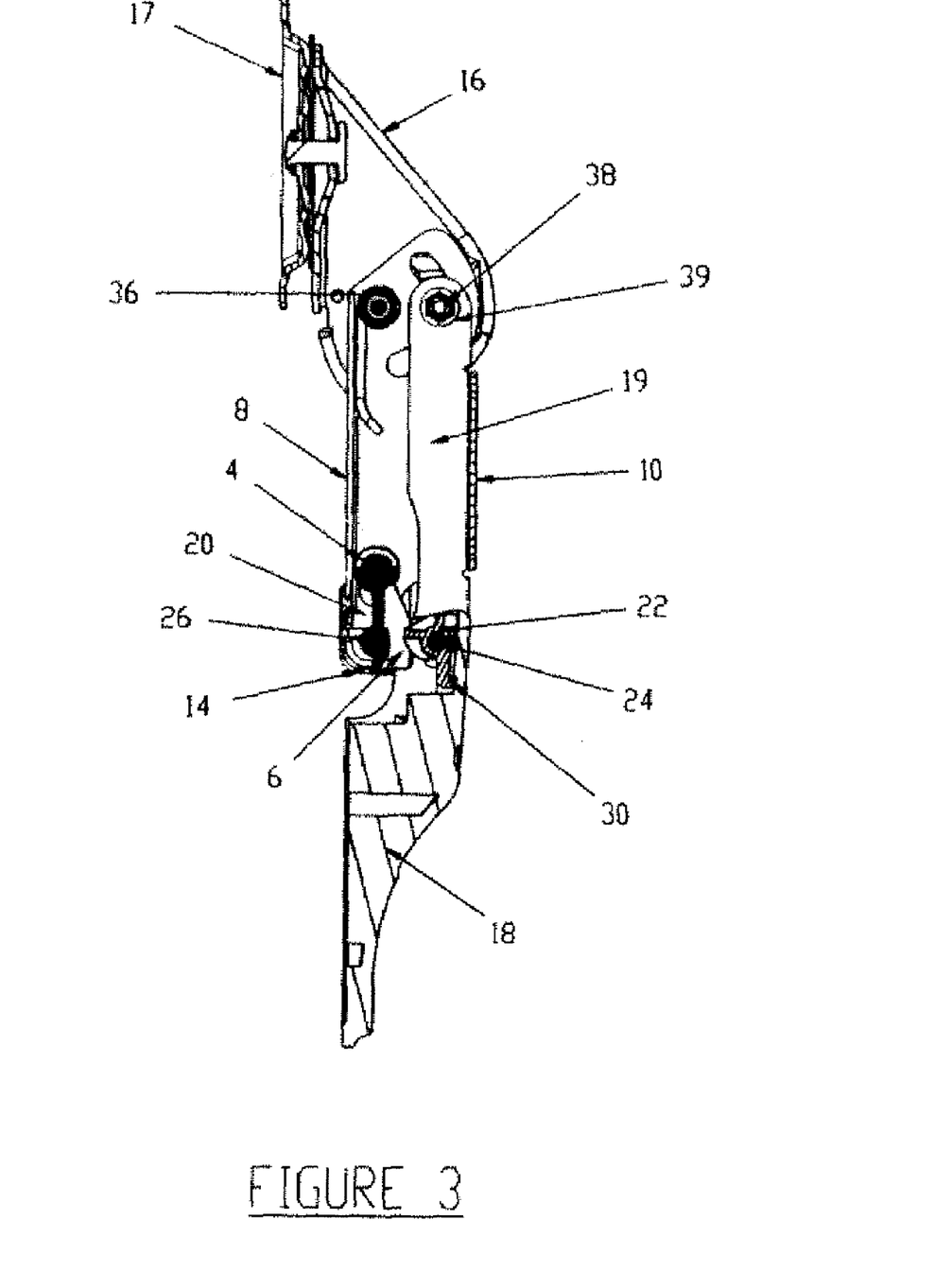
FIG. 3 is a sectional side view of a support arm along the lines A-A of FIG. 1 except that the cover is shown.
Figure 4:
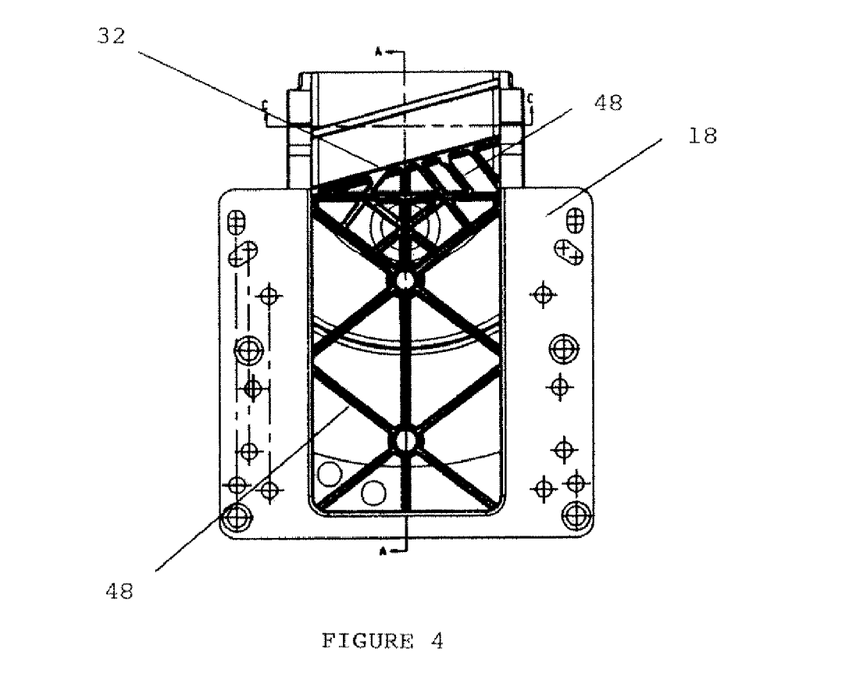
FIG. 4 is a top view of a platform.
Figure 5:
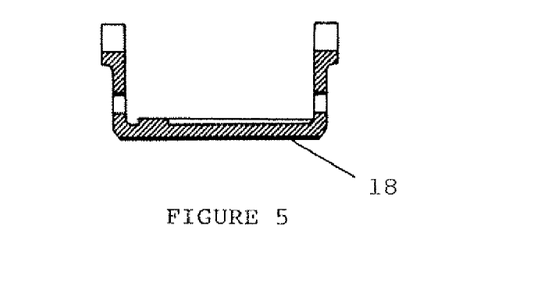
FIG. 5 is a sectional view of the platform along the lines C-C of FIG. 4.
Figure 6:
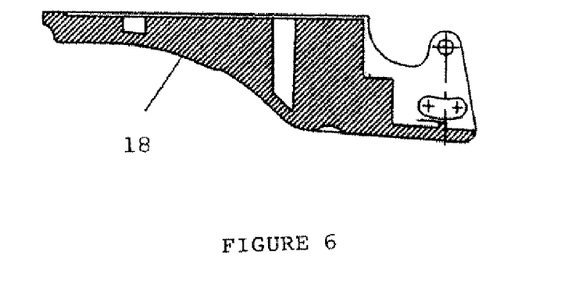
FIG. 6 is a sectional view of the platform along the lines A-A of FIG. 4.
Figure 7:
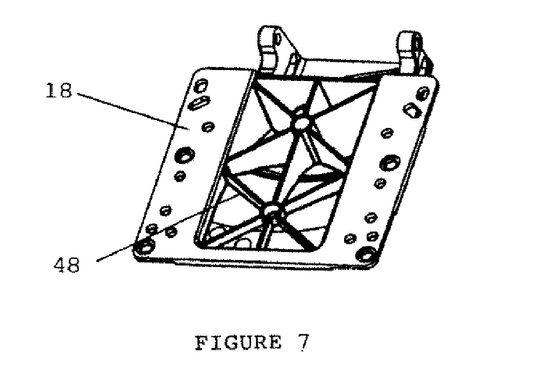
FIG. 7 is a prospective view of the platform when viewed from a top.
Figure 8:
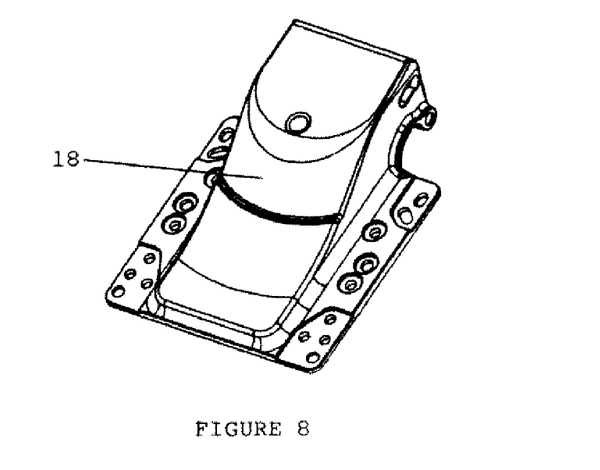
FIG. 8 is a prospective view of the platform when view from a bottom.

In FIGS. 1, 2 and 3, there is shown a top view, a prospective view and a sectional side view of an articulating support am 2 for use with a work station (not shown). In FIG. 1, a cover has been deleted to expose a universal screw 4 and slider 6. In FIGS. 2 and 3, the cover 8, which is deleted from FIG. 1, is shown. The cover 8 is part of a central body 10 with two ends 12, 14 being an inner end 12 and an outer end 14. The inner end 12 is pivotally connected to a base 16, which has a swivel plate 13 pivotally mounted thereon. The outer end 14 is pivotally connected to a platform 18. The central body 10 has a lower section 19 located beneath the cover 8. The slider 6 has an upper component 20 and a lower component 22. The lower component 22 is pivotally mounted on a rod 24. The rod 24 provides a pivot axis between the central body 10 and the platform 18. The upper component 20 has a screw thread therein (not shown) which corresponds to a screw thread on the universal screw 4. The upper component 20 has two openings (not shown in FIGS. 1 to 3) therein, and is pivotally mounted with the universal screw 4 extending through a first of the two openings and a guide bar 26 extending through a second of the two openings. As the universal screw 4 is turned by rotating a handle 28, the upper component 20 moves longitudinally along the universal screw 4 with the guide bar 26 sliding through the second opening in which the guide bar 26 is located. The guide bar 26 maintains the upper component 20 in a fixed radial position relative to the universal screw 4. As the upper component 20 moves sideways with the rotation of the universal screw 4, the lower component 22 also moves sideways along the rod 24 because the lower component 22 extends partially into the upper component 20.

The lower component 22 has an outer edge 30 that extends outward from the rod 24 and rests against an abutment 32. The abutment 32 is located in the platform 18 and is an integral part of the platform. The platform 18 is preferably made from cast metal and still more preferably made from fibre reinforced plastic. The platform is preferably molded in one piece. The abutment 32 is located at an angle to a threaded shaft 34 of the universal screw 4. The shaft 34 perpendicular to a longitudinal centre axis of the support arm and is parallel to the ends 12, 14 of the central body 10. As the handle 28 is rotated, the shaft 34 rotates and causes the upper component 20 of the slider 6 to move along the shaft 34 due to the interaction of the corresponding screw threads. The movement of the upper component 20 causes the lower component 22 of the slider 6 to also move along the rod 24. If the handle 28 is turned in a direction to move the slider 6 closer to the handle side of the support arm 2, a pitch of the platform 18 increases relative to the central body 10. When handle 28 is turned in an opposite direction, the slider 6 moves away from the handle 28 and the pitch of the platform 18 relative to the central body 10 decreases. There is one rod 36 and two bolts 38 located between the base 16 and the central body 10. There is one bolt 38 on each side of the base 16. The cover 8 of the central body 10 is pivotally connected to the base 16 through the rod 36. The lower section 19 of the central body 10 is pivotally connected to the base 16 through the bolts 38. The bolts 38 are held in place by nuts 39, only one of which is shown. When in the rest position shown in FIG. 2, the central body 10 is locked in position relative to the base 16 and will not pivot about the rod 36 or bolts 38. However, if the platform 18 is manually tilted upward, the bolts 38 are then pulled toward the platform 18 and the body 10 will then pivot relative to the base 16 about the pivot axis through the rod 36 and the pivot axis through the bolts 38 and can be moved to a desired position. More specifically, when the platform 18 is tilted upward, the cover 8 pivots about the rod 36, and the lower section 19 pivots about the bolts 38 to raise or lower the central body 10 relative to the base 16. When the platform 18 is tilted upward, the slider 6 moves away from the abutment 32. When the central body 10 is in the desired position, the upward force on the platform 18 is manually released (i.e. no longer manually tilted upward), and the central body 10 is then again in a locked position relative to the base 16. The movement of the base 16 and central body 10 relative to one another is the same as that described in U.S. Pat. No. 6,270,047 and is incorporated herein by reference.

The cover 8 of the central body 10 has a first scale 40 and an indicator 42 to show the height of the central body 10 relative to the base 16. A second scale 44 and indicator 46 shows the pitch of the platform 18 relative to the central body 10.

In FIGS. 4 to 8, inclusive, there are shown various views of the platform 18. The abutment 32 is an integral part of the platform 18. The platform 18 has reinforcing walls 48 therein. The same reference numerals are used in FIGS. 4 to 8 as those used in FIGS. 1 to 3 for those components that are identical. The abutment 32 is an angular wall that is integral with the platform and is cast or molded into the platform when the platform is manufactured.

Figure 9A:
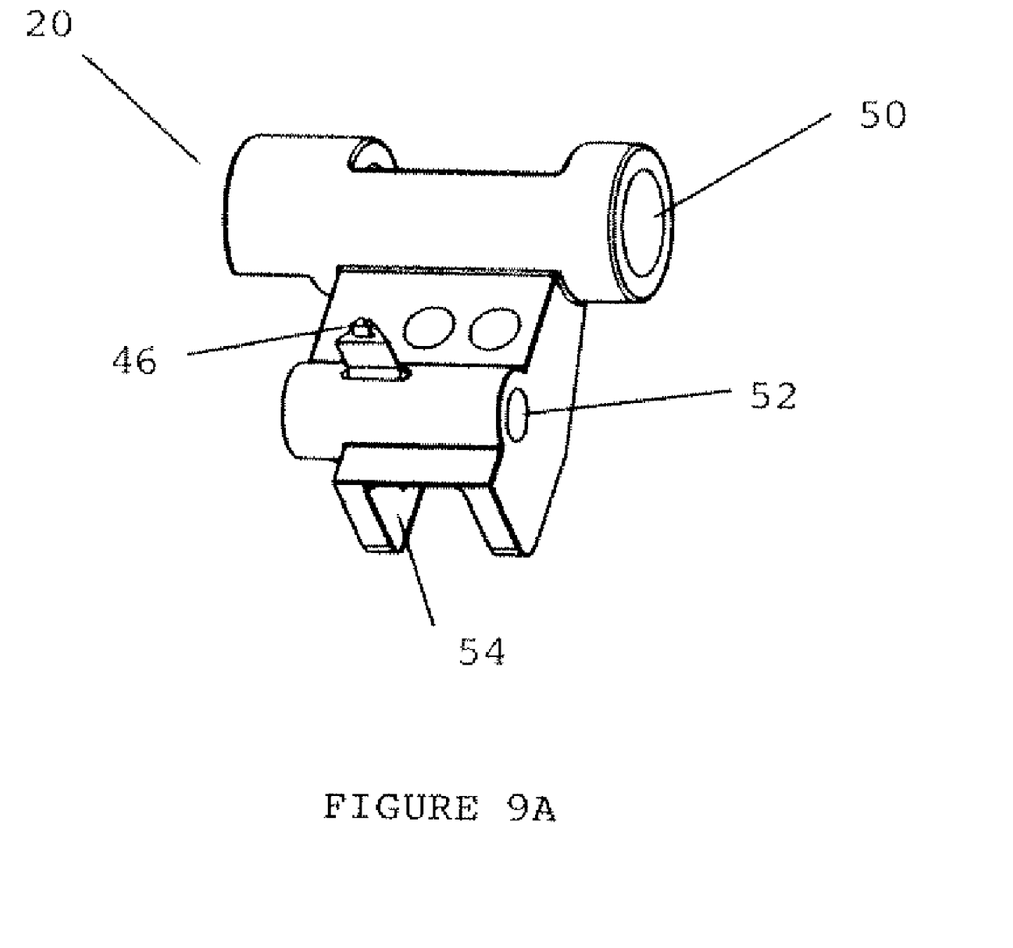
FIG. 9A is a prospective view of an upper component of the slider.
Figure 9B:
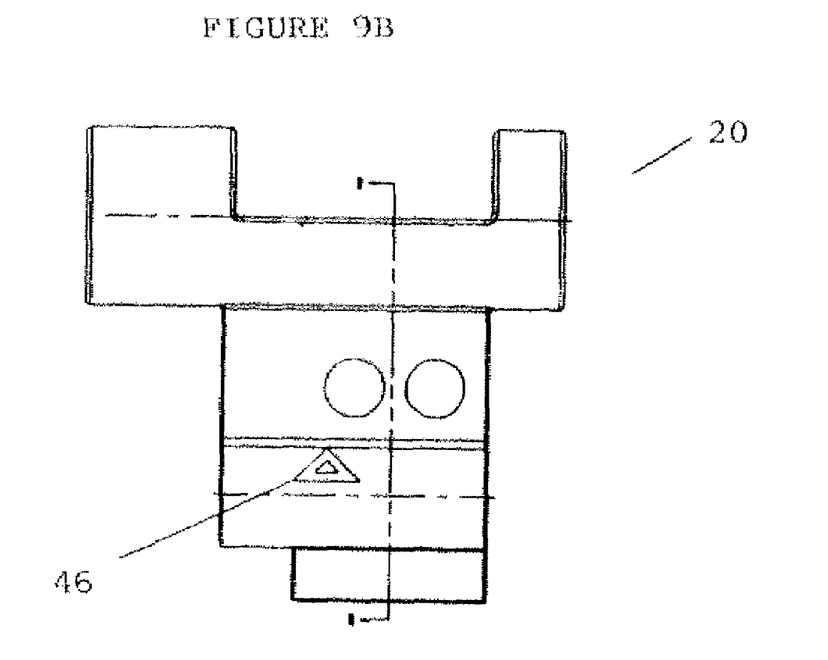
FIG. 9B is a top view of the upper component of the slider.
Figure 9C:
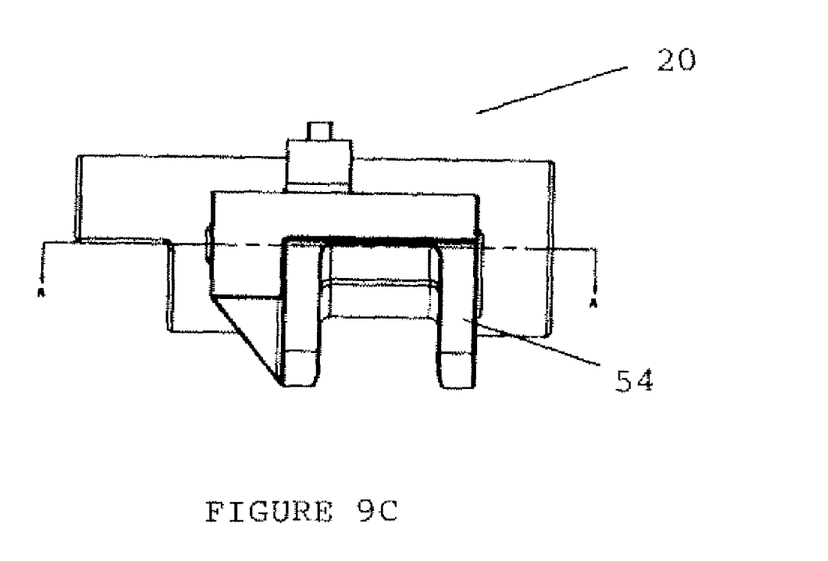
FIG. 9C is a front view of the upper component of the slider.
Figure 9D:
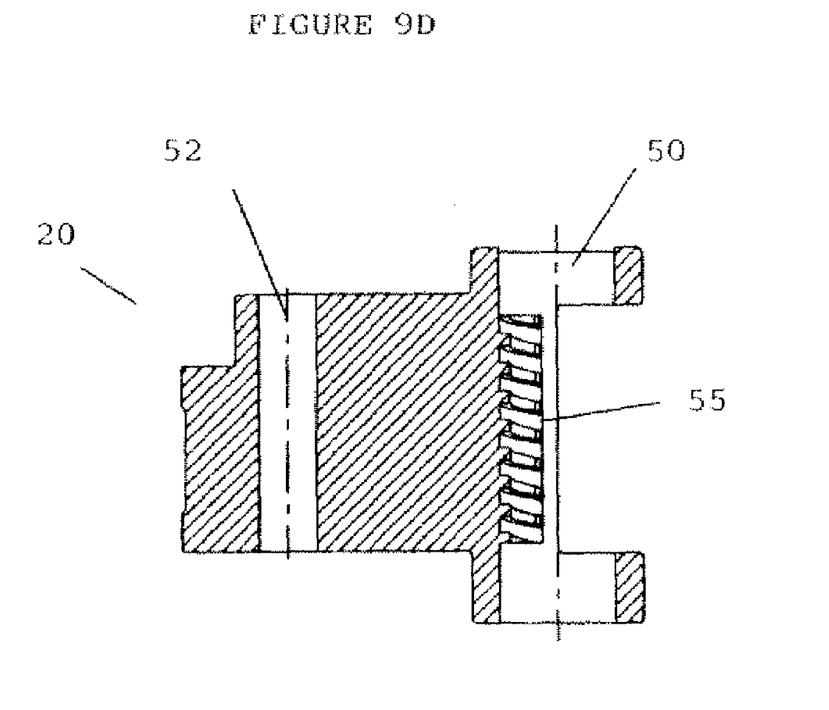
FIG. 9D is a sectional view along section lines A-A of FIG. 9C
Figure 9E:
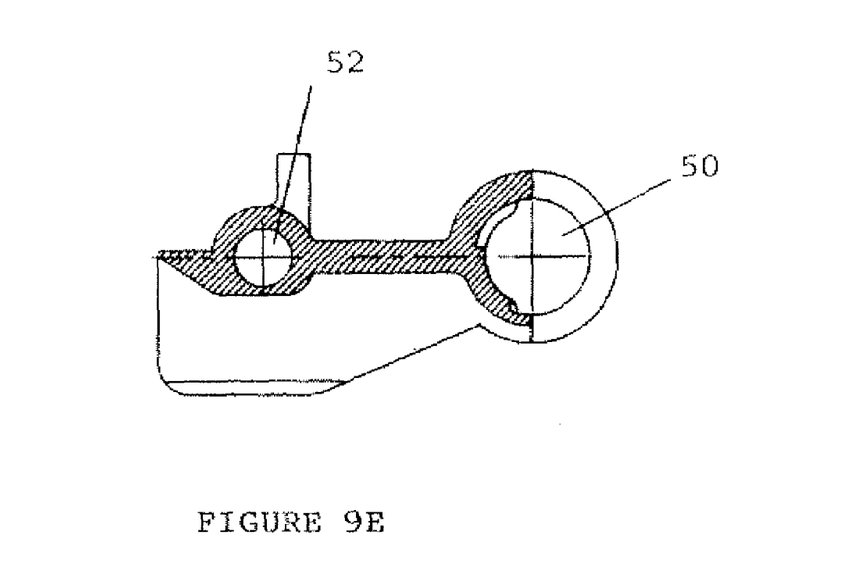
FIG. 9E is a sectional view along section lines B-B of FIG. 9B.

In FIGS. 9A to 9E, inclusive, there are shown various views of an upper component 20 of the slide 6. The entire slide 6 is not shown in FIGS. 9A to 9E. The upper component 20 has two openings 50, 52 therein to receive the shaft 34 of the universal screw 4 (not shown in FIGS. 9A to 9E) and to receive the guide bar 26 (not shown 9A to 9E) respectively. Beneath the openings 50, 52 there is located an inverted U-shaped channel 54, which straddles a ridge (not shown in FIGS. 9A to 9E) of the lower component 22 (not shown in FIGS. 9A to 9E). The indicator 46 is mounted above the opening 52. The opening 50 is the first opening and the opening 52 is the second opening in the upper component 20. In FIG. 9D, a partial screw thread 55 is located within the opening 50. The screw thread 55 corresponds to the screw thread on the shaft 34 of the universal screw 4.

Figure 10:
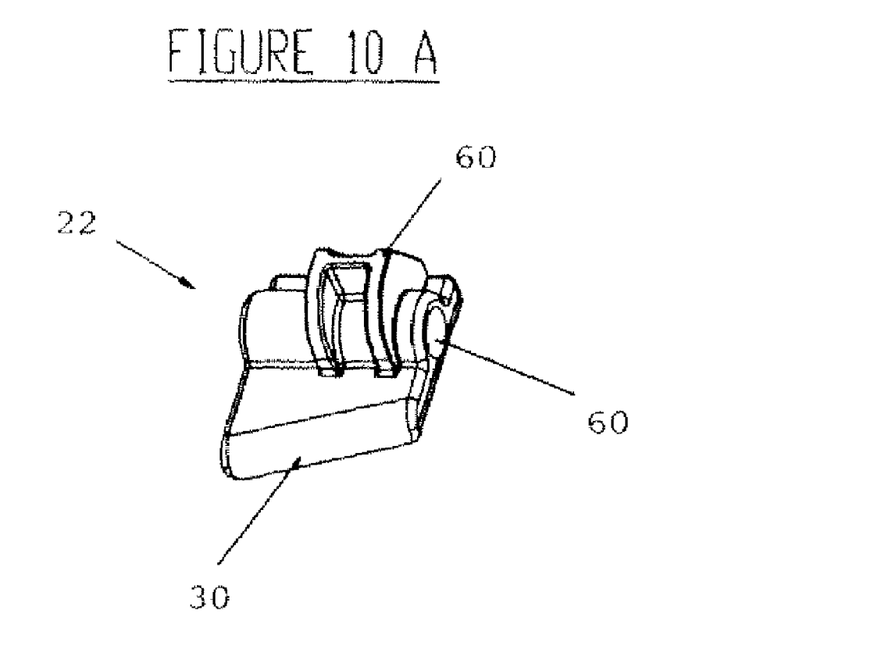
FIG. 10A is a prospective view of a lower component of the slider.
FIG. 10B is a prospective view of a lower component of the slider when viewed from a bottom.
FIG. 10C is a side view of the lower component of the slider when viewed from the right hand side of FIG. 10A.
FIG. 10D is a rear view of the lower component of the slider.
FIG. 10E is a sectional view of the lower component of the slider when viewed along the sections A-A of FIG. 10C.
FIG. 10F is a bottom view of the lower component of the slider.
Figure 10C:
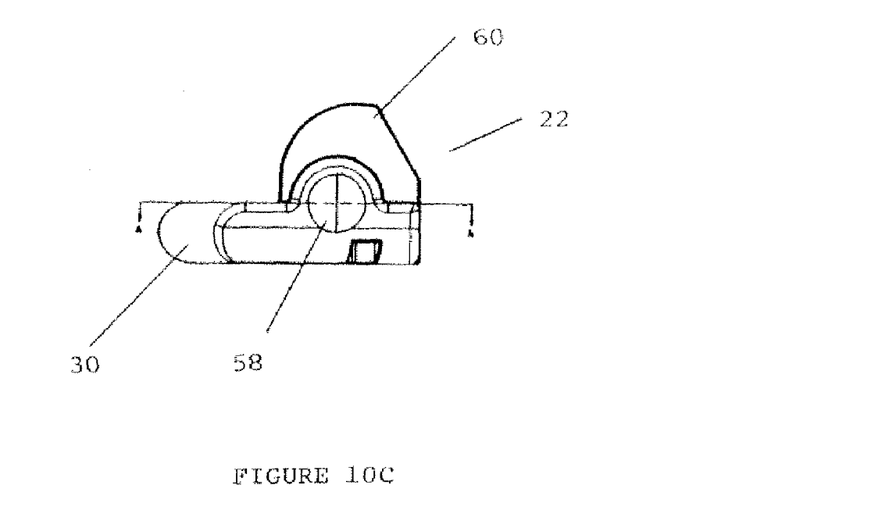

In FIGS. 10A to 10F, there is shown the lower component 22, which has an opening 58 therein to receive a rod 24 (not shown in FIGS. 10A to 10F). The outer edge 30 is tapered and the lower component 22 has a ridge 60 thereon that is sized to fit within the inverted U-shaped channel 54 of the upper component 20 (not shown in FIGS. 10A to 10F). In FIG. 10B, it can be seen that the lower component 22 has reinforcing walls 62 along a bottom thereof. The reinforcing walls 62 have a gap 64 therein that is parallel to the outer edge 30.

Figure 11:
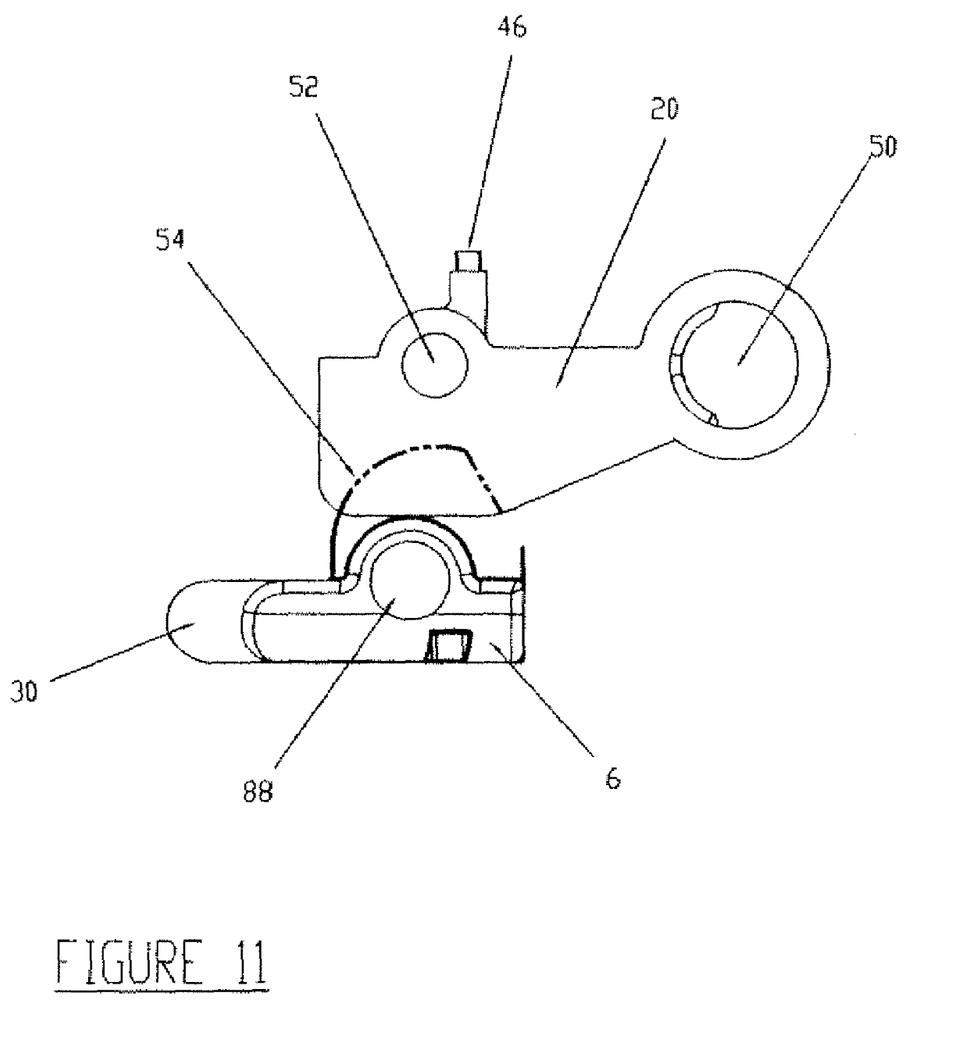
FIG. 11 is a side view of the upper and lower components of the slider in contact with one another.

In FIG. 11, there is shown a schematic side view of the upper component 20 and the lower component 22 in a typical position relative to one another with the ridge 60 located within the U-shaped channel 54. The components 20, 22 are able to pivot relative to one another when they are installed on the shaft 34, guide bar rod 26, and rod 24 (not shown in FIG. 11), but they are two separate components. While the slider is shown as being divided into two pieces, a support arm can be designed with a one piece slide that has an outer end that slides along the abutment and moves from side to side by rotating the universal screw. The outer edge of the slider can be wider or narrower than that shown in the drawings.

During manufacture, the slider can be installed on the central body, but the slider is not required to be installed on the platform or on the abutment. Since the abutment is integral with the platform, there is very little additional expense required to include the abutment in the platform compared to manufacturing a platform without the abutment and subsequently affixing the abutment to the platform. The slider is installed on the central body and the platform is pivotally connected to the central body. When the base is installed on the central body, the support arm is then operational. While the outer end of the slider that is in contact with the abutment and the abutment can be sized and shaped so that the slider is slidably connected to the abutment (as opposed to just being in contact therewith), that arrangement is not required.

I claim:

1. An articulating support arm for use with a workstation, said support arm comprising a central body with two ends, said two ends being an inner end and an outer end, said inner end having a base pivotally connected thereto, said base being directly or indirectly connected to said workstation, said outer end having a platform pivotally connected thereto, said platform having an angled abutment that is integral with said platform, said abutment being elongated and being located to be contacted by a slider extending between said abutment and a threaded shaft rotatably mounted at or near said outer end perpendicular to a longitudinal centre axis of said support arm, said slider having an upper component and a lower component that are mounted to interact with one another, said shaft extending parallel to a pivot axis extending between said central body and said platform, said slider being constructed to move along said shaft as said shaft rotates, said slider being sized and shaped to simultaneously slide along said abutment as said slider moves along said shaft to vary a pitch of said platform relative to said body.

2. An articulating support arm as claimed in claim 1 wherein said shaft and said slider have corresponding screw threads thereon to cause said slider to move along said shaft as said shaft rotates.

3. An articulating support arm as claimed in claim 2 wherein said abutment extends substantially across said platform.

4. An articulating support arm as claimed in claim 2 wherein said upper. component is mounted on said shaft and said lower component is mounted on a rod that is parallel to said shaft, said upper component and said lower component being in contact with one another so that said lower component moves laterally as said upper component moves laterally.

5. An articulating support arm as claimed in claim 4 wherein said rod provides a pivot axis between said central body and said platform.

6. An articulating support arm as claimed in claim 4 wherein said upper component is mounted to slide on a guide bar that is parallel to said shaft.

7. An articulating support arm as claimed in claim 1 wherein said platform is one piece and is made from one of a moldable thermoplastic material and cast metal.

8. An articulating support arm as claimed in claim 1 wherein said slider is mounted on said central body but is not mounted on said platform.

9. An articulating support arm as claimed in claim 1 wherein said base has a swivel plate pivotally mounted thereon.

10. An articulating support arm as claimed in claim 1 wherein said upper and lower components are separate components.

11. An articulating support arm for use with a workstation, said support arm comprising a central body with two ends, said two ends being an inner end and an outer end, said inner end having a base pivotally connected thereto, said based being directly or indirectly connected to said workstation, said outer end having a platform pivotally connected thereto, said platform having an angled abutment that is integral with said platform and extends from side to side across said platform, said abutment being located to be contacted by a slider extending between said abutment and a threaded shaft rotatably mounted at or near said outer end, said shaft extending parallel to a pivot axis extending between said central body and said platform, said slider being constructed to move along said shaft as said shaft rotates, said slider being sized and shaped to simultaneously slide along said abutment as said slider moves along said shaft to vary a pitch of said platform relative to said body.

12. An articulating support arm for use with a workstation, said support arm comprising a central body with two ends, said two ends being an inner end and an outer end, said inner end having a base pivotally connected thereto, said based being directly or indirectly connected to said workstation, said outer end having a platform pivotally connected thereto, said platform having an angled abutment that is integral with said platform and is an angled wall, said abutment being located to be contacted by a slider extending between said abutment and a threaded shaft rotatably mounted at or near said outer end, said shaft extending parallel to a pivot axis extending between said central body and said platform, said slider being constructed to move along said shaft as said shaft rotates, said slider being sized and shaped to simultaneously slide along said abutment as said slider moves along said shaft to vary a pitch of said platform relative to said body.

13. An articulating support arm for use with a workstation, said support arm comprising a central body with two ends, said two ends being an inner end and an outer end, said inner end being pivotally connected to a base, said base being directly or indirectly connected to said workstation, said outer end being pivotally connected to a platform, said platform having an abutment that is integral therewith, a shaft being rotatable at or near said outer end of said central body, said shaft having a first screw thread thereon, a slider being mounted on said shaft, said slider .having a second screw thread corresponding to said first screw thread, said slider moving along said shaft as said shaft rotates, said abutment being oriented at an angle to said shaft, and said slider being sized and shaped to contact and slide along said abutment as said shaft rotates, thereby varying a pitch of said platform relative to said body.

14. An articulating support arm as claimed in claim 13 wherein said slider has an upper component and a lower component that are mounted to interact with one another.

15. An articulating support arm as claimed in claim 14 wherein said abutment extends substantially across said platform and said upper component is mounted on said central body and said lower component is mounted on a rod that provides a pivot axis between said central body and said platform.

16. An articulating support arm as claimed in claim 13 wherein said slider has an upper component that is mounted on said shaft and a lower component that is mounted on a rod that is parallel to said shaft, said upper component and said lower component being shaped so that said lower component is caused to move laterally on said rod as said upper component moves laterally with rotation of said shaft.

17. An articulating support arm as claimed in claim 16 wherein said lower component is shaped to slide along said rod, said rod providing a pivot axis between said central body and said platform.

18. An articulating support arm as claimed in claim 17 wherein said upper component is mounted to slide on a guide bar that is parallel to said shaft, said guide bar being located on said central body.

19. An articulating support arm as claimed in claim 18 wherein said upper component has two openings therein, one for said shaft and one for said guide bar, said lower component having one opening therein for said rod.

20. An articulating support arm as claimed in claim 19 wherein said lower component has an outer edge that contacts and slides along said abutment as said shaft rotates.

21. An articulating support arm as claimed in claim 19 wherein said platform is one piece and is made from one of a moldable thermoplastic material and cast metal.

22. An articulating support arm as claimed in claim 17 wherein said upper component is prevented from rotating with said shaft by a guide, said guide being located apart from said shaft.

23. A method of constructing an articulating support arm for use with a workstation, said support arm having a central body with two ends, said two ends being an inner end and an outer end with a base located at an inner end and a platform located at an outer end, said method comprising pivotally connecting said central body to said base, forming said platform with an integral elongated angled abutment extending thereon, pivotally mounting said platform to said outer end, mounting a threaded slider on a threaded rotatable shaft on said central body at or near said outer end, orienting said abutment at an angle to said shaft, sizing and shaping said slider to slide along said abutment as said shaft is rotated, thereby varying a pitch of said platform relative to said central body.

* * * * *